US008126605B2

(12) United States Patent
Caminiti et al.

(10) Patent No.: US 8,126,605 B2
(45) Date of Patent: Feb. 28, 2012

(54) COMPUTING PLATFORM FOR MULTIPLE INTELLIGENT TRANSPORTATION SYSTEMS IN AN AUTOMOTIVE VEHICLE

(75) Inventors: Lorenzo Caminiti, Ann Arbor, MI (US); Michael E. Samples, Toledo, OH (US); Michael R. James, Dearborn, MI (US); Kenneth P. Laberteaux, Ann Arbor, MI (US); Derek S. Caveney, Ann Arbor, MI (US); Jeff B. Rogers, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 1040 days.

(21) Appl. No.: 11/950,537

(22) Filed: Dec. 5, 2007

(65) Prior Publication Data

US 2009/0150017 A1 Jun. 11, 2009

(51) Int. Cl.
*G01M 17/00* (2006.01)
*G06F 7/00* (2006.01)
*G06F 19/00* (2006.01)

(52) U.S. Cl. ............ 701/29; 701/33; 340/3.1; 340/3.43; 340/3.6

(58) Field of Classification Search .................... 701/23, 701/24, 29, 33; 726/3–4, 7, 26; 340/3.1, 340/3.43, 3.6
See application file for complete search history.

(56) References Cited

U.S. PATENT DOCUMENTS

| | | | | |
|---|---|---|---|---|
| 4,924,418 | A * | 5/1990 | Bachman et al. | 702/188 |
| 5,508,689 | A * | 4/1996 | Rado et al. | 340/3.1 |
| 6,336,128 | B1 | 1/2002 | Eisenmann et al. | |
| 6,850,824 | B2 * | 2/2005 | Breed | 701/36 |
| 6,988,026 | B2 * | 1/2006 | Breed et al. | 701/29 |
| 7,149,660 | B2 | 12/2006 | Kuehn et al. | |
| 7,239,956 | B2 * | 7/2007 | Sonoda et al. | 701/111 |
| 7,467,034 | B2 * | 12/2008 | Breed et al. | 701/29 |
| 7,891,004 | B1 * | 2/2011 | Gelvin et al. | 726/26 |
| 8,024,084 | B2 * | 9/2011 | Breed | 701/29 |
| 2005/0182534 | A1 | 8/2005 | Legate et al. | |

(Continued)

FOREIGN PATENT DOCUMENTS

BR 200705114 A2 * 6/2009

(Continued)

OTHER PUBLICATIONS

Multipriority video transmission for third-generation wireless communication systems; Gharavi, H.; Alamouti, S.M.; Proceedings of the IEEE; vol. 87 , Issue: 10; Digital Object Identifier: 10.1109/5.790635 Publication Year: 1999 , pp. 1751-1763.*

(Continued)

*Primary Examiner* — Cuong H Nguyen
(74) *Attorney, Agent, or Firm* — Gifford, Krass, Sprinkle, Anderson & Citkowski, P.C.

(57) ABSTRACT

A computing platform for multiple intelligent transportation systems in an automotive vehicle having a plurality of sensors which generate output signals representative of various vehicle operating parameters. The platform includes a vehicle data center which receives input signals from the vehicle sensors and the vehicle data center is configured to transform these input signals into output signals having a predetermined format for each of the vehicle operating parameters. A central processing unit receives the output signal from the vehicle data and is programmed to process the vehicle data center output signals for each of the intelligent transportation systems and generate the appropriate output signals as a result of such processing.

3 Claims, 1 Drawing Sheet

U.S. PATENT DOCUMENTS

| | | | | |
|---|---|---|---|---|
| 2006/0271254 | A1 | 11/2006 | Shah et al. | |
| 2007/0156312 | A1 * | 7/2007 | Breed et al. | 701/29 |
| 2008/0284575 | A1 * | 11/2008 | Breed | 340/438 |

FOREIGN PATENT DOCUMENTS

| | | | | |
|---|---|---|---|---|
| DE | 10037849 | A1 | * | 2/2002 |
| DE | 102010001383 | A1 | * | 8/2011 |
| FR | 2955893 | A1 | * | 8/2011 |
| JP | 2001-301485 | A | | 10/2001 |

OTHER PUBLICATIONS

The ENVISAT data products; Levrini, G.; Brooker, G.;Geoscience and Remote Sensing Symposium, 2000. Proceedings. IGARSS 2000. IEEE 2000 International; vol. 3; Digital Object Identifier: 10.1109/IGARSS.2000.858066 Publication Year: 2000 , pp. 1198-1201 vol. 3.*

A methodological framework for integrated control in corridor networks; Pavlis, Y.; Recker, W.; Intelligent Transportation Systems, 2001. Proceedings. 2001 IEEE; Digital Object Identifier: 10.1109/ITSC.2001.948734; Publication Year: 2001 , pp. 637-642.*

Adaptive and cooperative multi-agent fuzzy system architecture; Daneshfar, F.; Akhlaghian, F.; Mansoori, F.; Computer Conference, 2009. CSICC 2009. 14th International CSI; Digital Object Identifier: 10.1109/CSICC.2009.5349439 Publication Year: 2009 , pp. 30-34.*

Diesel Engine Online Monitoring Based on Smart Order Tracking Sensor System; Cheng Lijun; Zhang Yingtang; Li Zhining; Ren Guoquan; Li Jianwei; Measuring Technology and Mechatronics Automation (ICMTMA), 2011 Third International Conference on vol. 1; Digital Object Identifier: 10.1109/ICMTMA.2011.270; Publication Year: 2011 , pp. 1079-1082.*

Cooperative Maneuvering in Close Environments Among Cybercars and Dual-Mode Cars; Milanés, V.; Alonso, J.; Bouraoui, L.; Ploeg, J.; Intelligent Transportation Systems, IEEE Transactions on; vol. 12 , Issue: 1; Digital Object Identifier: 10.1109/TITS.2010.2050060; Publication Year: 2011 , pp. 15-24.*

Extrinsic calibration between a multi-layer lidar and a camera; Rodriguez F, S.A.; Fremont, V.; Bonnifait, P.; Multisensor Fusion and Integration for Intelligent Systems, 2008. MFI 2008. IEEE International Conference on; Digital Object Identifier: 10.1109/MFI.2008.4648067; Publication Year: 2008 , pp. 214-219.*

Study of Control Algorithm for Smart Car System; Ruixian Li; Information and Computing (ICIC), 2011 Fourth International Conference on; Digital Object Identifier: 10.1109/ICIC.2011.113; Publication Year: 2011 , pp. 184-187.*

A Comparative Study of Different Sensors for Smart Car Park Management; Kumar, R.; Chilamkurti, N.K.; Ben Soh; Intelligent Pervasive Computing, 2007. IPC. The 2007 International Conference on; Digital Object Identifier: 10.1109/IPC.2007.29 Publication Year: 2007 , pp. 499-502.*

* cited by examiner

COMPUTING PLATFORM FOR MULTIPLE INTELLIGENT TRANSPORTATION SYSTEMS IN AN AUTOMOTIVE VEHICLE

BACKGROUND OF THE INVENTION

I. Field of the Invention

The present invention relates generally to a computing platform for multiple intelligent transportation systems for an automotive vehicle.

II. Description of Related Art

Modern day automotive vehicles contain multiple intelligent transportation systems which operate in the area of active safety, mobility, commercial applications and the like. For example, such systems include collision avoidance applications, such as emergency brake light application, traffic light signal condition, etc. Furthermore, many of these safety applications rely upon dedicated short range radio communication between the vehicle and near vehicles or near infrastructure.

Similarly, modern automotive vehicles also employ intelligent transportation systems for commercial purposes, such as the purchase of goods by the operator of the vehicle and from commercial establishments.

Previously, these intelligent transportation systems have each employed their own dedicated electronic computing unit (ECU) which was designed and programmed to serve a specific function. For example, in modern day automotive vehicles, one ECU may monitor the condition of an oncoming traffic light, a separate ECU monitor the condition of the brake pedal for emergency braking collision avoidance systems while still other ECUs are programmed for the other intelligent transportation systems. A primary disadvantage of these previously known systems is that, since each ECU is dedicated not only to its own system, but also the particular sensors utilized by that particular automotive vehicle, it is oftentimes difficult if not impossible to adapt the ECU for a particular intelligent transportation system from one vehicle and to a different vehicle which utilizes different sensors. This, in turn, increases the overall cost of the development of intelligent transportation systems for new vehicles since the individual sensors and their associated ECUs must be reprogrammed and/or redesigned whenever the vehicle and/or sensor design changes.

A still further disadvantage of the previously known intelligent transportation systems which utilize dedicated ECUs to control the operation of the transportation system is that the additional cost of the ECUs increases dramatically as the number of different intelligent transportation systems increases within the vehicle. This, in turn, increases the overall cost of the vehicle itself.

SUMMARY OF THE PRESENT INVENTION

The present invention provides a computing platform that overcomes the above-mentioned disadvantages of the previously known automotive vehicles.

In brief, the present invention provides a computing platform for multiple intelligent transportation systems in an automotive vehicle having a plurality of sensors. Each sensor generates an output signal representative of a vehicle operating parameter. Such operating parameters would include, for example, vehicle speed, throttle position sensor, brake light position, GPS location, etc.

A vehicle data center then receives all of the input signals from the vehicle sensors. The vehicle data center is configured to transform the input signals from the sensors into output signals having a predetermined format for each vehicle operating parameter. For example, the vehicle data center receives input from various sensors which correspond to the vehicle speed, and these sensors would vary from one vehicle to the next. However, the vehicle data center is configured to provide a standard format output signal regardless of the type of sensor or sensors used in the automotive vehicle.

A central processing unit then receives the output signals from the vehicle data center. Since the vehicle data center has been configured to provide the output signals in the predetermined format for each of the vehicle operating parameters, the vehicle data center effectively abstracts the data provided to the central processor from the sensors themselves. As such, the central processor can be programmed to process the output from the vehicle data center for each of the intelligent transportation systems and generate the appropriate output signals as a result of that processing. Furthermore, since the vehicle data center completely abstracts the sensor output signals from the central processing unit, the programming for the central processing unit may remain constant over different vehicle models and model years for the various intelligent transportation systems. This, in turn, simplifies the development of the new vehicles since the same software for the intelligent transportation systems may be used in different and new vehicles.

A message dispatcher communicates by short range radio communication with adjacent vehicles and/or infrastructure adjacent the road. For example, the message dispatcher may control communications from a traffic light indicative of the condition of the traffic light. Similarly, the message dispatcher is able to receive data communications representing an emergency braking of a vehicle as well as transmit radio signals in the event of an emergency braking condition.

The message dispatcher also provides output signals in a preset format to the central processor. The central processor then processes the message dispatch processor output signals for at least one, and more typically many, of the intelligent transportation systems and generates appropriate output signals as a result of that processing. Furthermore, the message dispatcher abstracts the radio communication from the central processor so that software dealing with the message dispatcher may also be utilized for different and future vehicles.

BRIEF DESCRIPTION OF THE DRAWING

A better understanding of the present invention will be bad upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
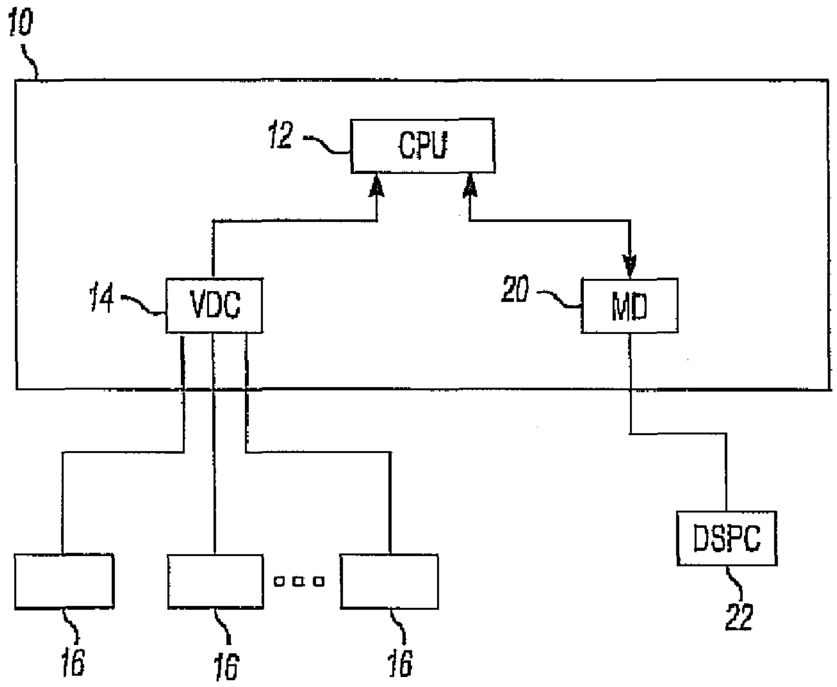
FIG. 1 is a block diagrammatic view of a preferred embodiment of the present invention.

With reference first to FIG. 1, a computing platform 10 for multiple intelligent transportation systems in an automotive vehicle is there shown diagrammatically. Such intelligent transportation systems include, for example, anti-collision and other safety systems of an automotive vehicle. For example, such intelligent transportation systems may include emergency brake light application, for example, a vehicle forwardly of the current vehicle which engages in a braking action, traffic light communication systems, and other anti-collision systems.

The computing platform 10 includes a vehicle data center 14. The vehicle data center 14 receives inputs from a plurality of engine sensors 16 wherein each sensor is representative of a vehicle operating parameter, such as vehicle speed, direction, acceleration/deceleration, etc. These sensors, furthermore, may vary from one vehicle type and to the next as well as from one model year and subsequent model years.

The vehicle data center 14 is configured to transform the input signals from each vehicle sensor 16 to a predetermined format for each of the various vehicle operating parameters. The vehicle data center 14 then provides the transformed signals from the sensors 16 as an input signal to the central processing unit 12.

For example, a wide range of different types of sensors, such as GPS, axle speed sensor, engine speed sensor, etc., may be employed to determine the vehicle speed. The vehicle data center 14, however, is configured by software to transform these signals into a predetermined format, e.g. 0 to 10 volts corresponding to a vehicle speed of 0 to 100 miles an hour, and provides this output signal to the central processing unit 12. In doing so, the vehicle data center 14 completely abstracts the sensors 16 from the central processing unit 12. Consequently, since the vehicle data center 14, once configured, completely abstracts the type of sensor 16 employed in the vehicle from the central processing unit 12, once the central processing unit 12 is programmed to execute a particular intelligent transportation system, such software for that intelligent transportation system remains unchanged regardless of the vehicle in which the computing platform 10 is installed.

Figure 2:
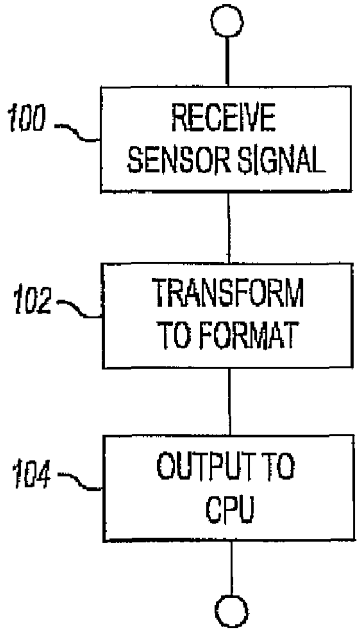
FIG. 2 is a flow chart illustrating the operation of the vehicle data center.

With reference now to FIG. 2, the operation of the vehicle data center is there shown diagrammatically. After the vehicle data center 14 has been configured for the particular automobile, the vehicle data center receives the sensor(s) signal at step 100 which corresponds to the vehicle operating parameters for the particular vehicle. Step 100 then proceeds to step 102.

At step 102, the vehicle data center, under software control, transforms the data from the vehicle sensors received at step 100 into a predetermined format corresponding to a vehicle operating parameter, such as vehicle speed, acceleration/deceleration, etc. This format for a selected parameter will be the same regardless of the type of vehicle. Step 102 then proceeds to step 104.

At step 104 the vehicle data center 14 outputs the now formatted output representative of the desired vehicle operating parameter to the central processing unit 12. In doing so, the central processing unit 12 utilizes the data representing the vehicle operating parameter without the need to further manipulate the data as a function of the vehicle type or model year.

With reference again to FIG. 1, the computing platform 10 also includes a message dispatcher 20 which communicates by radio to nearby vehicles and/or infrastructure through a radio module 22, such as a dedicated short range radio communication module, e.g. at 9.1 GHz. The format for the radio module 22, however, may vary between different vehicles and/or types of communications. For example, the radio messages transmitted or received by the radio module 22 may comprise messages of fixed length or of variable length, typically including start bits and stop bits.

The message dispatcher 20 is then configured to format the radio communications from the radio module 22 into a preset format and this information is provided to the central processing unit 12 for incoming messages. For outgoing messages, the message dispatcher 22 is configured to accept commands from the central processing unit 12 and to configure these messages into the appropriate output signals for the radio module 22. As such, the message dispatcher 20 abstracts the radio module 22 from the central processing unit 12 in a manner similar to the vehicle data center which abstracts the sensor 16 from the central processor 12.

Figure 3:
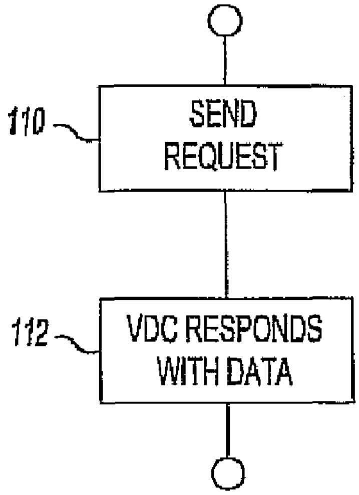
FIG. 3 is a flow chart illustrating the generation of the message dispatcher.

With reference now to FIG. 3, an exemplary communication between the central processing unit 12 and the vehicle data center 14 is illustrated. At step 110 the central processing unit 12 sends a request to receive a particular vehicle operating parameter, e.g. speed. Step 110 then proceeds to step 112.

At step 112, the vehicle data center 14 responds to the request at step 110 by providing data to the central processing unit 12 representative of the requested vehicle operating parameter. Since the response provided by the vehicle data center 14 to the request sent at step 110 is completely abstracted from the type of sensors 16 (FIG. 1) employed by the vehicle, the programming for the step 110 for the central processing unit 12 remains constant regardless of the type of vehicle or model year. The message dispatcher 22 is also employed to transmit data by radio.

From the foregoing, it can be seen that the present invention provides a computing platform for multiple intelligent transportation systems in an automotive vehicle in which the central processing unit 12 is abstracted from the particular sensor 16 or radio module 22 by the vehicle data center 14 and message dispatcher 20, respectively. As such, it is only necessary to configure the vehicle data center and message dispatcher 20 in order to adapt the platform 10 to a different vehicle or different model year of the vehicle while the application software executed by the central processing unit for the various intelligent transportation systems remains unchanged. This, in turn, not only enables the intelligent transportation system software executed by the central processing unit 12 to be utilized over different vehicles and model years, but also enables improvement in such software which extends simultaneously across multiple vehicles and multiple vehicle platforms.

Having described our invention, however, many modifications thereto will become apparent to those skilled in the art to which it pertains without deviation from the spirit of the invention as defined by the scope of the appended claims.

We claim:

1. A computing platform for multiple intelligent transportation systems in multiple different automotive vehicles, each vehicle having a plurality of sensors which generate output signals representative of different vehicle operating parameters, said platform comprising:

a vehicle data center which receives input signals from the vehicle sensors, said vehicle data center configured to transform said input signals from sensors for the same vehicle operating parameter and having different output signals for the same value of the operating parameter into output signals having a predetermined format for each vehicle operating parameter, so that the output signal from the vehicle data center of every vehicle operating parameter at any given operating condition is identical regardless of the sensor used to detect each vehicle operating parameter, a central processing unit which receives said output signals from said vehicle data center, said central processor programmed to process said vehicle data center output signals for each intelligent transportation system and generate appropriate output signals as a result of said processing.

2. The invention as defined in claim 1 and comprising a message dispatcher which coordinates short range radio communications and generates output signals in a preset format as a result of said communications, said central processor programmed to process said dispatcher output signals for at least one of the intelligent transportation systems and generate appropriate output signals as a result of said processing.

3. The invention as defined in claim 1 wherein the intelligent transportation systems comprise vehicle safety systems.

* * * * *